(12) United States Patent
Su et al.

(10) Patent No.: US 8,102,602 B2
(45) Date of Patent: Jan. 24, 2012

(54) DISPLAY AND METHOD FOR MODIFYING COLOR RESISTS OF COLOR FILTER

(75) Inventors: Ya-Ling Su, Hsin-Chu (TW);
Chun-Liang Lin, Hsin-Chu (TW);
Chun-Chieh Wang, Hsin-Chu (TW);
Chen-Hsien Liao, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 564 days.

(21) Appl. No.: 12/390,627

(22) Filed: Feb. 23, 2009

(65) Prior Publication Data
US 2010/0110690 A1     May 6, 2010

(30) Foreign Application Priority Data
Nov. 3, 2008   (TW) .............................. 97142412 A

(51) Int. Cl.
*G02B 27/14*     (2006.01)
*G09G 3/32*     (2006.01)
*G02F 1/1335*     (2006.01)

(52) U.S. Cl. ............................ 359/634; 345/82; 349/106
(58) Field of Classification Search .................. 359/634
See application file for complete search history.

(56) References Cited

U.S. PATENT DOCUMENTS
2006/0284532 A1* 12/2006 Kurihara et al. .............. 313/110
2009/0002858 A1* 1/2009 Okutsu et al. ................ 359/891
* cited by examiner

*Primary Examiner* — Dawayne A Pinkney
(74) *Attorney, Agent, or Firm* — Thomas, Kayden, Horstemeyer & Risley, LLP

(57) ABSTRACT

A method for modifying color resists of color filter includes the steps of: providing a white light-emitting diode (WLED) emitting light having wavelength of $\lambda_i$ and having an emission spectrum $BL(\lambda_i)$; providing a color filter comprising a plurality of red, green and blue color resists and having a transmission spectrum $CF(\lambda_i)$; modifying compositions or concentrations of pigments of the red color resists to increase transmission rate of the wavelength $\lambda_i$ ranging between 580 nm and 600 nm for the red color resists; and modifying compositions or concentrations of pigments of the green color resists to increase transmission rate of the wavelength $\lambda_i$ ranging between 570 nm and 590 nm for the green color resists. A display is also disclosed herein.

20 Claims, 11 Drawing Sheets

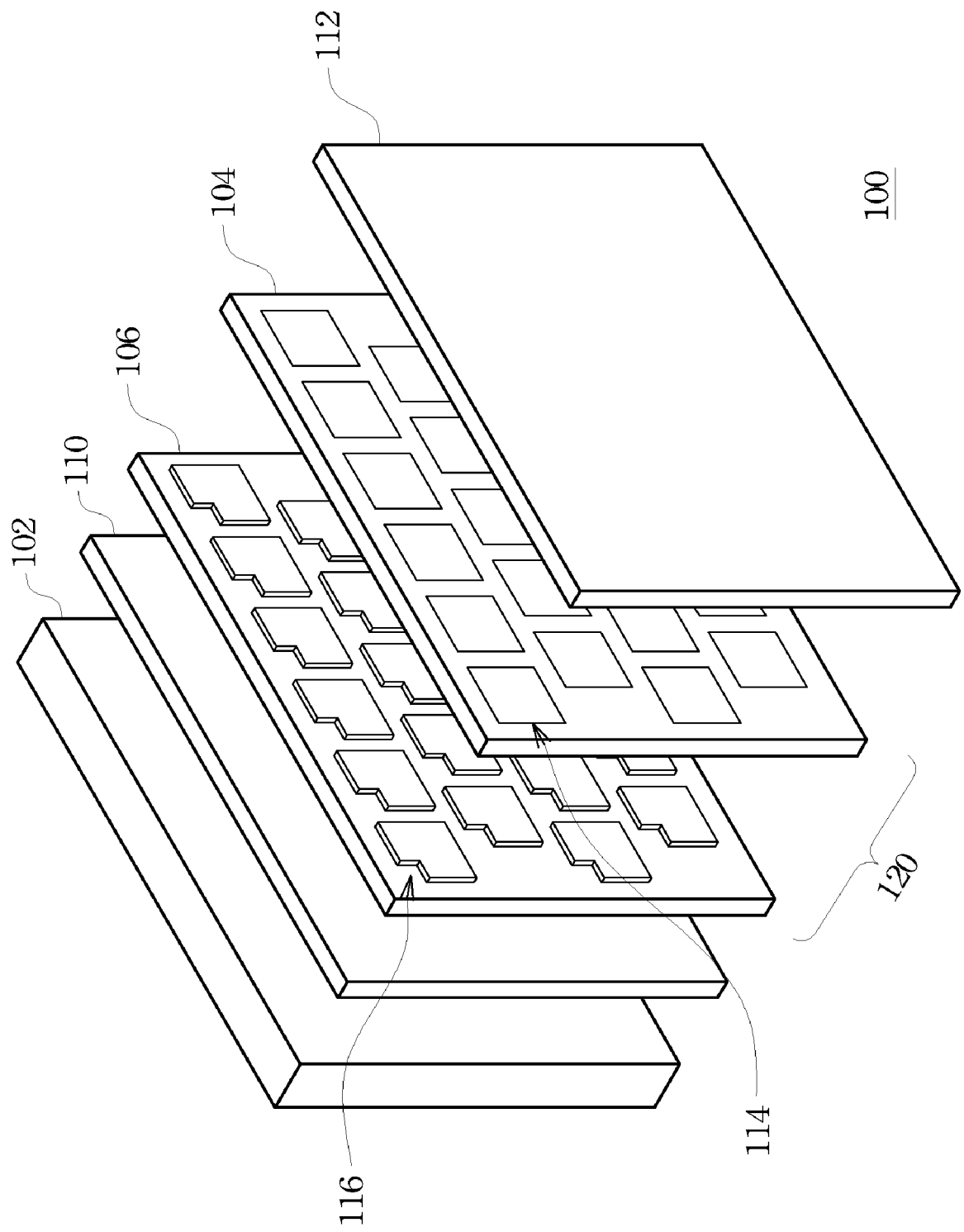

US 8,102,602 B2

DISPLAY AND METHOD FOR MODIFYING COLOR RESISTS OF COLOR FILTER

RELATED APPLICATIONS

This application claims priority to Taiwan Patent Application Serial Number 97142412, filed Nov. 3, 2008, which is herein incorporated by reference.

BACKGROUND

1. Field of Invention

The present invention relates to a display and method for modifying color resists of a color filter therein. More particularly, the present invention relates to a display having a WLED backlight module and method for modifying color resists of a color filter therein.

2. Description of Related Art

Light-emitting diodes are gradually employed as a backlight source in backlight modules of liquid crystal displays due to their advantages such as power-saving, small volume, etc. However, for a liquid crystal display using white light-emitting diodes (WLEDs) as a backlight source, the color performance is usually different from that of the display using cold cathode fluorescent lamps (CCFLs) because the WLEDs emit white light after blue LED grains react with green and red phosphors therein, such that the colors shown on the display using the WLEDs are not fully expected or natural, or even fail to meet the universal standards such as sRGB (standard RGB) or EBU (European Broadcasting Union). As a result, for the display using the WLEDs as a backlight source, the colors shown on a CIE 1931 chrominance chart may have problems such as the red, green and blue colors all having deviations.

SUMMARY

In accordance with one embodiment of the present invention, a display is provided. The display includes a white light-emitting diode (WLED) and a color filter. The WLED is provided for emitting light having wavelength of $\lambda_i$ and has an emission spectrum $BL(\lambda_i)$. The color filter corresponds to the WLED and comprises a plurality of red, green and blue color resists, in which the color filter has a transmission spectrum $CF(\lambda_i)$. The emission spectrum $BL(\lambda_i)$ and the transmission spectrum $CF(\lambda_i)$ have specific relations therebetween, as follows:

$Y(\lambda_j)=CF(\lambda_i) \times BL(\lambda_i), \lambda_j=\lambda_1;$ $MAX(\lambda_i)=MAX[CF(\lambda_i) \times BL(\lambda_i)], \lambda_i=\lambda_2;$ $0.20 \leq Y(\lambda_1)/MAX((\lambda_2) \leq 1;$ wherein the wavelength $\lambda_i$ ranges between 590 nm and 600 nm, $Y(\lambda_1)$ is a product of the transmission spectrum $CF(\lambda_1)$ and the emission spectrum $BL(\lambda_1)$, $MAX(\lambda_2)$ is a maximum of the product of the transmission spectrum $CF(\lambda_2)$ and the emission spectrum $BL(\lambda_2)$.

In accordance with another embodiment of the present invention, a method for modifying color resists of color filter is provided. The method comprises the steps of: providing a white light-emitting diode (WLED) emitting light having wavelength of $\lambda_i$ and having an emission spectrum $BL(\lambda_i)$; providing a color filter comprising a plurality of red, green and blue color resists and having a transmission spectrum $CF(\lambda_i)$; modifying compositions or concentrations of pigments of the red color resists to increase transmission rate of the wavelength $\lambda_i$ ranging between 580 nm and 600 nm for the red color resists; and modifying compositions or concentrations of pigments of the green color resists to increase transmission rate of the wavelength $\lambda_i$ ranging between 570 nm and 590 nm for the green color resists.

In accordance with yet another embodiment of the present invention, a display is provided. The display includes a white light-emitting diode (WLED) and a color filter. The WLED emits light having wavelength of $\lambda_i$ and has an emission spectrum $BL(\lambda_i)$. The color filter corresponds to the WLED and comprises a plurality of red, green and blue color resists. The red color resists have pigments with compositions or concentrations capable of increasing transmission rate of the wavelength $\lambda_i$ ranging between 580 nm and 600 nm for the red color resists, and the green color resists have pigments with compositions or concentrations capable of increasing transmission rate of the wavelength $\lambda_j$ ranging between 570 nm and 590 nm for the green color resists.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows:

FIG. 1 illustrates a general diagram of a display according to one embodiment of the present invention;

DESCRIPTION OF THE PREFERRED EMBODIMENTS

Figure 2A:
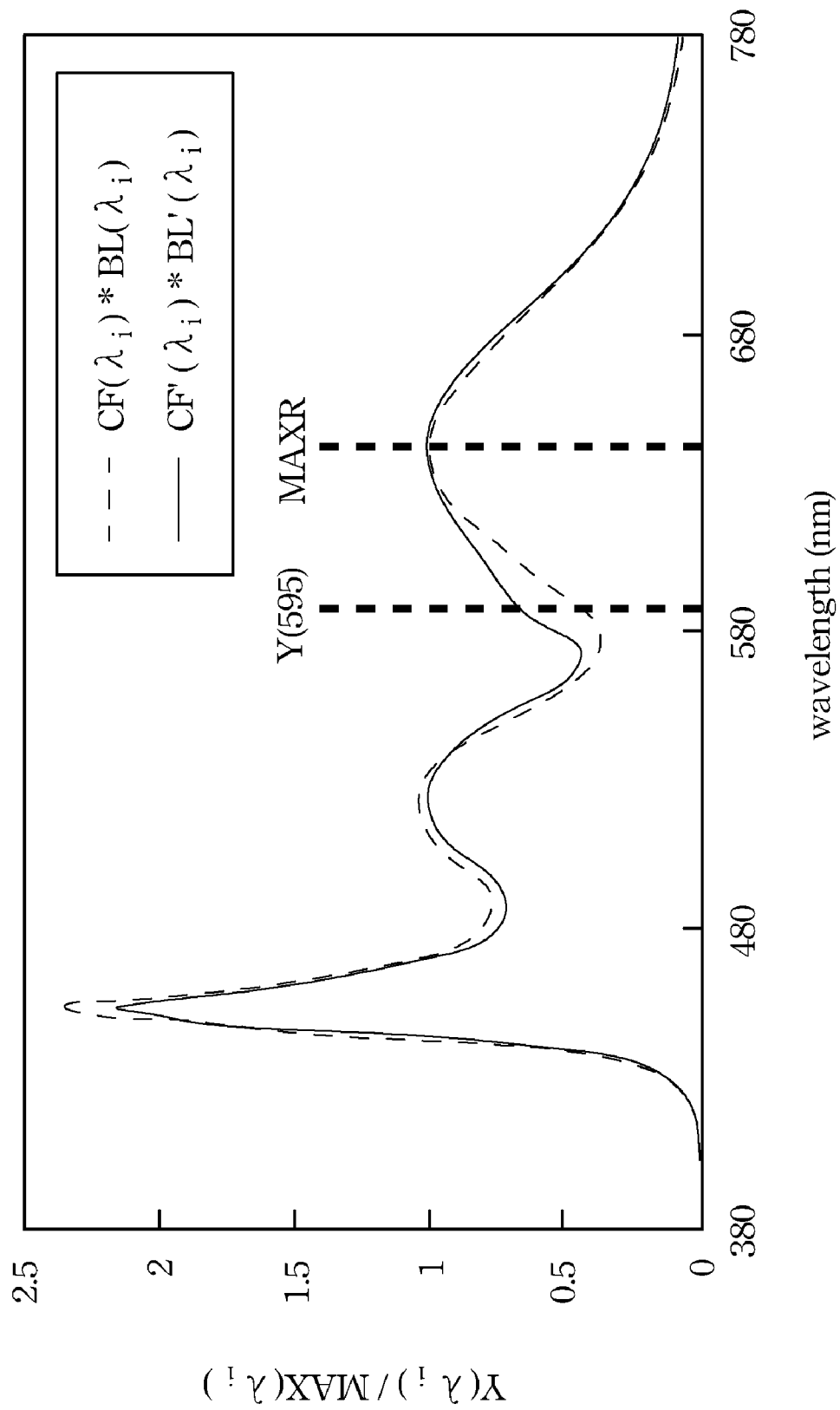
FIGS. 2a-2c illustrate the comparisons of Y(595) and MAX($\lambda_2$) between the display with modified resists and the display without modified resists according to the embodiments of the present invention.

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

FIG. 1 illustrates a general diagram of a display according to one embodiment of the present invention. The display 100 includes a backlight module 102, polarizers 110 and 112, an array substrate 106 and a color filter 104, in which the backlight module 102 includes white light-emitting diodes (WLEDs) (not shown) as the backlight source. The array substrate 106 and the color filter 104 correspond to the backlight module 102 and the WLEDs therein and form a liquid crystal display (LCD) panel 120. The array substrate 106 has a plurality of pixels 116 thereon. The color filter 104 has red, green and blue resists (or filtering layers) 114 thereon, respectively corresponding to the pixels 116 on the array substrate 106. When the white lights emitted from the WLEDs are transmitted through the red, green and blue resists 114 on the color filter 104, they can be converted into corresponding lights with different colors. With changes of the polarizing angles and after color mixture of the lights having different intensities and transmitted through the color filter 104, an image with different colors and brightness will be shown.

The WLEDs in the backlight module 102 are provided for emitting light having wavelength of $\lambda_j$ and have an emission spectrum $BL(\lambda_i)$, and the color filter has a transmission spectrum $CF(\lambda_i)$. In one embodiment, the compositions or concentrations of pigments of the red, green and blue color resists 114 on the color filter 104 can be modified such that the emission spectrum $BL(\lambda_i)$ and the transmission spectrum $CF(\lambda_i)$ have specific relations therebetween, as follows:

$$Y(\lambda_i)=CF(\lambda_i)\times BL(\lambda_i), \lambda_i=\lambda_1;$$

$$MAX(\lambda_i)=MAX[CF(\lambda_i)\times BL(\lambda_i)], \lambda_i=\lambda_2;$$

$$0.20 \leq Y(\lambda_1)/MAX(\lambda_2) \leq 1;$$

in which the wavelength $\lambda_1$ can range between 590 nanometer (nm) and 600 nm, the wavelength $\lambda_2$ can be the wavelength of red, green or blue light, $Y(\lambda_1)$ is defined as a product of the transmission spectrum $CF(\lambda_1)$ and the emission spectrum $BL(\lambda_1)$, $MAX(\lambda_2)$ is defined as a maximum of the product of the transmission spectrum $CF(\lambda_2)$ and the emission spectrum $BL(\lambda_2)$.

The following are several embodiments specifically describing the specific relations between the emission spectrum $BL(\lambda_i)$ and the transmission spectrum $CF(\lambda_i)$ according to different wavelengths and the conditions after they are transmitted through the color filter 104.

First Embodiment

In the present embodiment, the emission spectrum $BL(\lambda_i)$ of the WLEDs has a relatively maximum brightness peak when the wavelength $\lambda_i$ ranges between 430 nm and 470 nm, 490 nm and 570 nm, and 600 nm and 680 nm, respectively. The wavelength $\lambda_1$ can be approximately 595 nm, and the wavelength $\lambda_2$ can range between 620 nm and 680 nm (within band of red light). At that moment, the emission spectrum $BL(\lambda_i)$ and the transmission spectrum $CF(\lambda_i)$ have specific relations therebetween, as follows:

$$Y(\lambda_1)=CF(\lambda_1)\times BL(\lambda_1);$$

$$MAX(\lambda_2)=MAX[CF(\lambda_2)\times BL(\lambda_2)];$$

$$0.55 \leq Y(\lambda_1)/MAX(\lambda_2) \leq 1;$$

that is, when the wavelength $\lambda_1$ is 595 nm and the wavelength $\lambda_2$ ranges between 620 nm and 680 nm (within band of red light), the ratio of the product $Y(\lambda_1)$, i.e. $Y(595)$, of the transmission spectrum $CF(\lambda_1)$ and the emission spectrum $BL(\lambda_1)$ to the maximum $MAX(\lambda_2)$ of the product of the transmission spectrum $CF(\lambda_2)$ and the emission spectrum $BL(\lambda_2)$ ranges from 0.55 to 1. In another embodiment, for the same conditions described above, the ratio of $Y(\lambda_1)$ to $MAX(\lambda_2)$ can even range from 0.65 to 1.

FIG. 2a illustrates the comparison of $Y(595)$ and $MAX(\lambda_2)$ between the display with modified resists and the display without modified resists according to the embodiment of the present invention. As shown in FIG. 2a, the horizontal axis represents the wavelength of the light spectrum, the vertical axis represents the dimensionless ratio $Y(\lambda_i)/MAX(\lambda_i)$, the dotted line represents the condition before the resists are modified, the solid line represents the condition after the resists are modified, MAXR represents the maximum of the product of the transmission spectrum $CF(\lambda_2)$ and the emission spectrum $BL(\lambda_2)$ when the wavelength $\lambda_2$ ranges between 620 nm and 680 nm (within band of red light), and $Y(595)$ represents the product of the transmission spectrum $CF(\lambda_1)$ and the emission spectrum $BL(\lambda_1)$ when the wavelength $\lambda_i$ is approximately 595 nm.

As shown in FIG. 2a, by modifying the compositions or concentrations of the pigments of the red and green color resists such that the red and green color are slanted toward yellow color or being pale, the value of $Y(595)$ can be increased such that the ratio of $Y(595)$ to MAXR meets the relation of $0.55 \leq Y(595)/MAXR \leq 1$.

Furthermore, for convenient analysis, FIG. 2a and the following comparisons related to the ratio of $Y(\lambda_1)$ to $MAX(\lambda_2)$ are the comparison diagrams all illustrated based on single value of $MAX(\lambda_2)$ (the value is specified to be 1); that is, they are all normalized comparison diagrams.

Second Embodiment

In the present embodiment, the emission spectrum $BL(\lambda_i)$ of the WLEDs has a relatively maximum brightness peak when the wavelength $\lambda_i$ ranges between 430 nm and 470 nm, 490 nm and 570 nm, and 600 nm and 680 nm, respectively. The wavelength $\lambda_1$ can be approximately 595 nm, and the wavelength $\lambda_2$ can range between 490 nm and 570 nm (within band of green light). At that moment, the emission spectrum $BL(\lambda_i)$ and the transmission spectrum $CF(\lambda_i)$ have specific relations therebetween, as follows:

$$Y(\lambda_1)=CF(\lambda_1)\times BL(\lambda_1);$$

$$MAX(\lambda_2)=MAX[CF(\lambda_2)\times BL(\lambda_2)];$$

$$0.55 \leq Y(\lambda_1)/MAX(\lambda_2) \leq 1;$$

that is, when the wavelength $\lambda_1$ is 595 nm and the wavelength $\lambda_2$ ranges between 490 nm and 570 nm (within band of green light), the ratio of the product $Y(\lambda_1)$, i.e. $Y(595)$, of the transmission spectrum $CF(\lambda_1)$ and the emission spectrum $BL(\lambda_1)$ to the maximum $MAX(\lambda_2)$ of the product of the transmission spectrum $CF(\lambda_2)$ and the emission spectrum $BL(\lambda_2)$ ranges from 0.55 to 1. In another embodiment, for the same conditions described above, the ratio of $Y(\lambda_1)$ to $MAX(\lambda_2)$ can even range from 0.7 to 1.

Figure 2B:
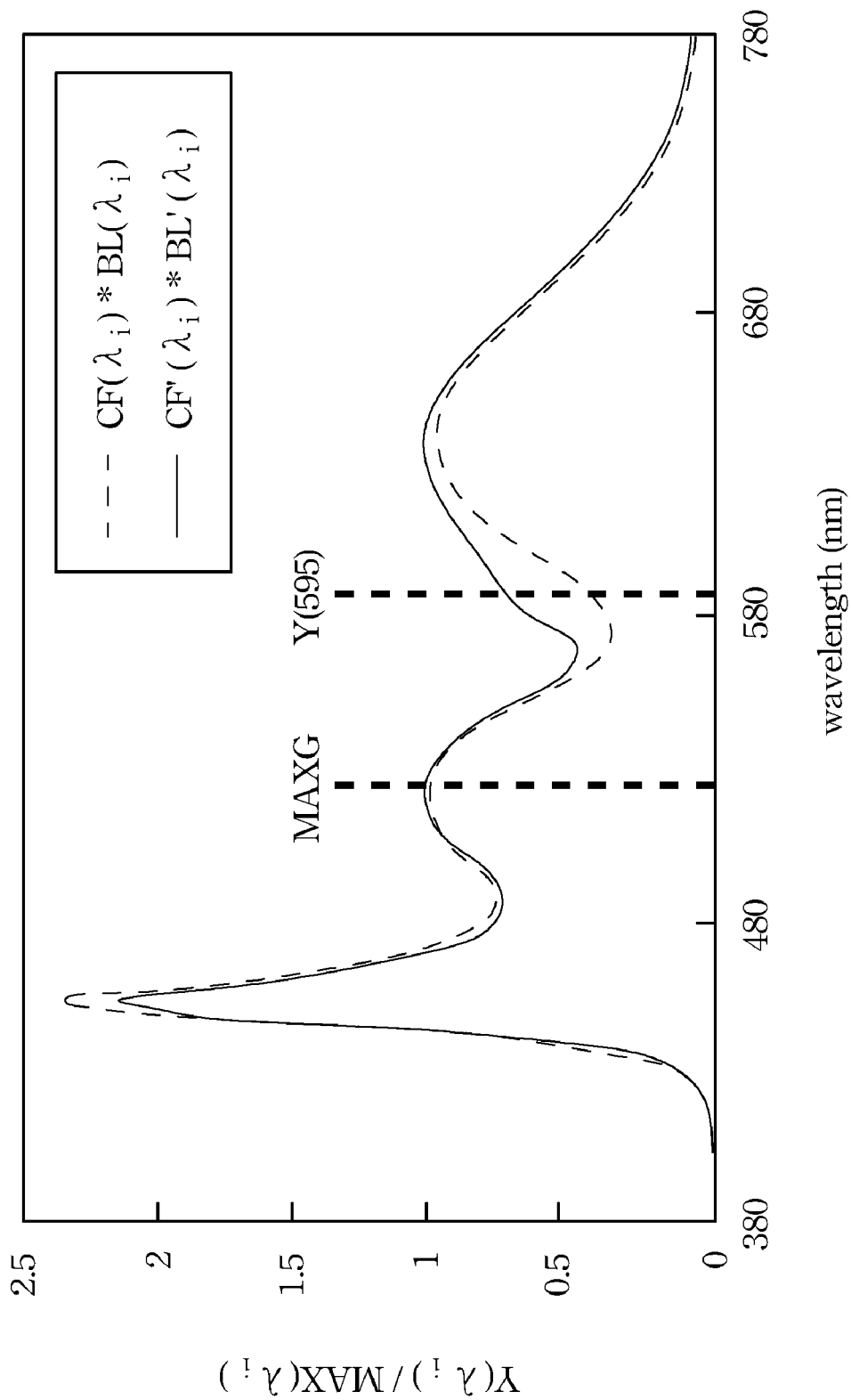

FIG. 2b illustrates the comparison of $Y(595)$ and $MAX(\lambda_2)$ between the display with modified resists and the display without modified resists according to the embodiment of the present invention. As shown in FIG. 2b, the horizontal axis represents the wavelength of the light spectrum, the vertical axis represents the dimensionless ratio $Y(\lambda_i)/MAX(\lambda_i)$, the dotted line represents the condition before the resists are modified, the solid line represents the condition after the resists are modified, MAXG represents the maximum of the product of the transmission spectrum $CF(\lambda_2)$ and the emission spectrum $BL(\lambda_2)$ when the wavelength $\lambda_2$ ranges between 490 nm and 570 nm (within band of green light), and $Y(595)$ represents the product of the transmission spectrum $CF(\lambda_1)$ and the emission spectrum $BL(\lambda_1)$ when the wavelength $\lambda_1$ is approximately 595 nm.

As shown in FIG. 2b, by modifying the compositions or concentrations of the pigments of the red and green color resists such that the red and green color are slanted toward yellow color or being pale, the value of $Y(595)$ can be increased such that the ratio of Y(595) to MAXG meets the relation of $0.55 \leq Y(595)/MAXG \leq 1$.

Third Embodiment

In the present embodiment, the white balance color temperature of the display ranges between 5000 K and 8500 K. The emission spectrum $BL(\lambda_i)$ of the WLEDs has a relatively maximum brightness peak when the wavelength $\lambda_i$ ranges between 430 nm and 470 nm, 490 nm and 570 nm, and 600 nm and 680 nm, respectively. The wavelength $\lambda_1$ can be approximately 595 nm, and the wavelength $\lambda_2$ can range between 430 nm and 470 nm (within band of blue light). At that moment, the emission spectrum $BL(\lambda_i)$ and the transmission spectrum $CF(\lambda_i)$ have specific relations therebetween, as follows:

$$Y(\lambda_1) = CF(\lambda_1) \times BL(\lambda_1);$$

$$MAX(\lambda_2) = MAX[CF(\lambda_2) \times BL(\lambda_2)];$$

$$0.25 \leq Y(\lambda_1)/MAX(\lambda_2) \leq 1;$$

that is, when the wavelength $\lambda_1$ is 595 nm and the wavelength $\lambda_2$ ranges between 430 nm and 470 nm (within band of blue light), the ratio of the product $Y(\lambda_1)$, i.e. Y(595), of the transmission spectrum $CF(\lambda_1)$ and the emission spectrum $BL(\lambda_1)$ to the maximum $MAX(\lambda_2)$ of the product of the transmission spectrum $CF(\lambda_2)$ and the emission spectrum $BL(\lambda_2)$ ranges from 0.25 to 1. In another embodiment, for the same conditions described above, the ratio of $Y(\lambda_1)$ to $MAX(\lambda_2)$ can even range from 0.3 to 1.

Figure 2C:
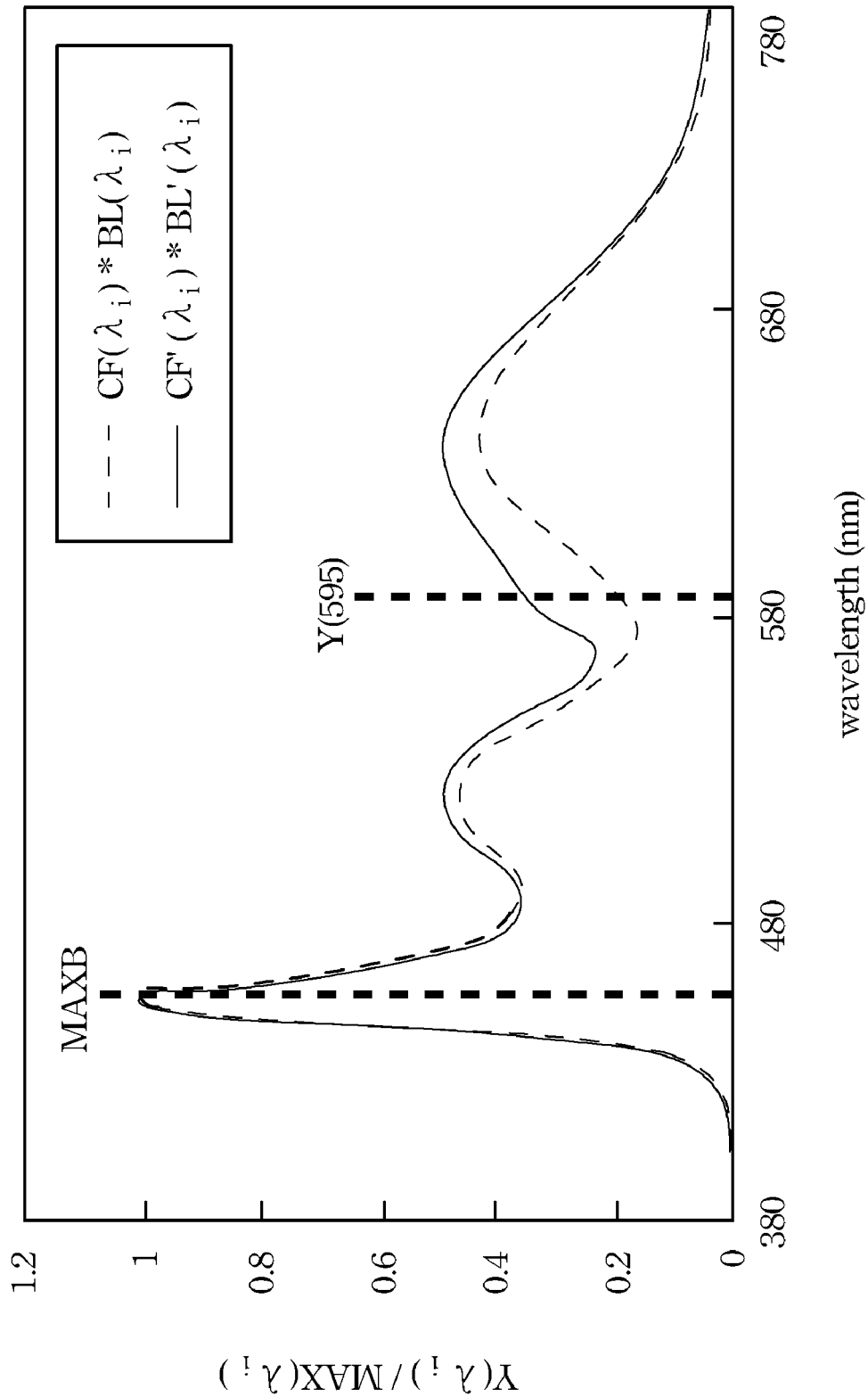

FIG. 2c illustrates the comparison of Y(595) and $MAX(\lambda_2)$ between the display with modified resists and the display without modified resists according to the embodiment of the present invention. As shown in FIG. 2c, the horizontal axis represents the wavelength of the light spectrum, the vertical axis represents the dimensionless ratio $Y(\lambda_i)/MAX(\lambda_i)$, the dotted line represents the condition before the resists are modified, the solid line represents the condition after the resists are modified, MAXB represents the maximum of the product of the transmission spectrum $CF(\lambda_2)$ and the emission spectrum $BL(\lambda_2)$ when the wavelength $\lambda_2$ ranges between 430 nm and 470 nm (within band of green light), and Y(595) represents the product of the transmission spectrum $CF(\lambda_1)$ and the emission spectrum $BL(\lambda_1)$ when the wavelength $\lambda_1$ is approximately 595 nm.

As shown in FIG. 2c, by modifying the compositions or concentrations of the pigments of the red and green color resists such that the red and green color are slanted toward yellow color or being pale, the value of Y(595) can be increased such that the ratio of Y(595) to MAXB meets the relation of $0.25 \leq Y(595)/MAXB \leq 1$.

Fourth Embodiment

In the present embodiment, the white balance color temperature of the display ranges between 8500 K and 11500 K. The emission spectrum $BL(\lambda_i)$ of the WLEDs has a relatively maximum brightness peak when the wavelength $\lambda_i$ ranges between 430 nm and 470 nm, 490 nm and 570 nm, and 600 nm and 680 nm, respectively. The wavelength $\lambda_1$ can be approximately 595 nm, and the wavelength $\lambda_2$ can range between 430 nm and 470 nm (within band of blue light). At that moment, the emission spectrum $BL(\lambda_i)$ and the transmission spectrum $CF(\lambda_i)$ have specific relations therebetween, as follows:

$$Y(\lambda_1) = CF(\lambda_1) \times BL(\lambda_1);$$

$$MAX(\lambda_2) = MAX[CF(\lambda_2) \times BL(\lambda_2)];$$

$$0.2 \leq Y(\lambda_1)/MAX(\lambda_2) \leq 1;$$

that is, when the wavelength $\lambda_1$ is 595 nm and the wavelength $\lambda_2$ ranges between 430 nm and 470 nm (within band of blue light), the ratio of the product $Y(\lambda_1)$, i.e. Y(595), of the transmission spectrum $CF(\lambda_1)$ and the emission spectrum $BL(\lambda_1)$ to the maximum $MAX(\lambda_2)$ of the product of the transmission spectrum $CF(\lambda_2)$ and the emission spectrum $BL(\lambda_2)$ ranges from 0.2 to 1.

When the compositions or concentrations of the pigments of the red, green and blue color resists 114 on the color filter 104 are modified such that the emission spectrum $BL(\lambda_i)$ of the WLEDs and the transmission spectrum $CF(\lambda_i)$ of the color filter 104 meet one of the foregoing specific relations, the red image shown on the display 100 has an X-axis chrominance value ranging from 0.635 to 0.75 ($0.635 \leq Rx \leq 0.75$) on the CIE 1931 chrominance chart; the green image shown on the display 100 has an Y-axis chrominance value ranging from 0.595 to 0.85 ($0.595 \leq Gy \leq 0.85$) on the CIE 1931 chrominance chart; the blue image shown on the display 100 has an Y-axis chrominance value ranging from 0 to 0.065 ($0 \leq By \leq 0.065$) on the CIE 1931 chrominance chart. As a result, the image shown on the display 100 can thus meet the chrominance standard of sRGB. In one embodiment, the chrominance coordinates (Rx, Ry) of the red color is (0.64, 0.33), the chrominance coordinates (Gx, Gy) of the green color is (0.30, 0.60), and the chrominance coordinates (Bx, By) of the blue color is (0.15, 0.06).

Moreover, even if different WLEDs are provided as a backlight source, the color resists 114 on the color filter 104 can also be modified such that the emission spectrum $BL(\lambda_i)$ of a new backlight source and the transmission spectrum $CF(\lambda_i)$ of the color filter 104 meet one of the foregoing specific relations as well, and the image shown on the display 100 can thus meet the chrominance standard of sRGB.

Figure 3A:
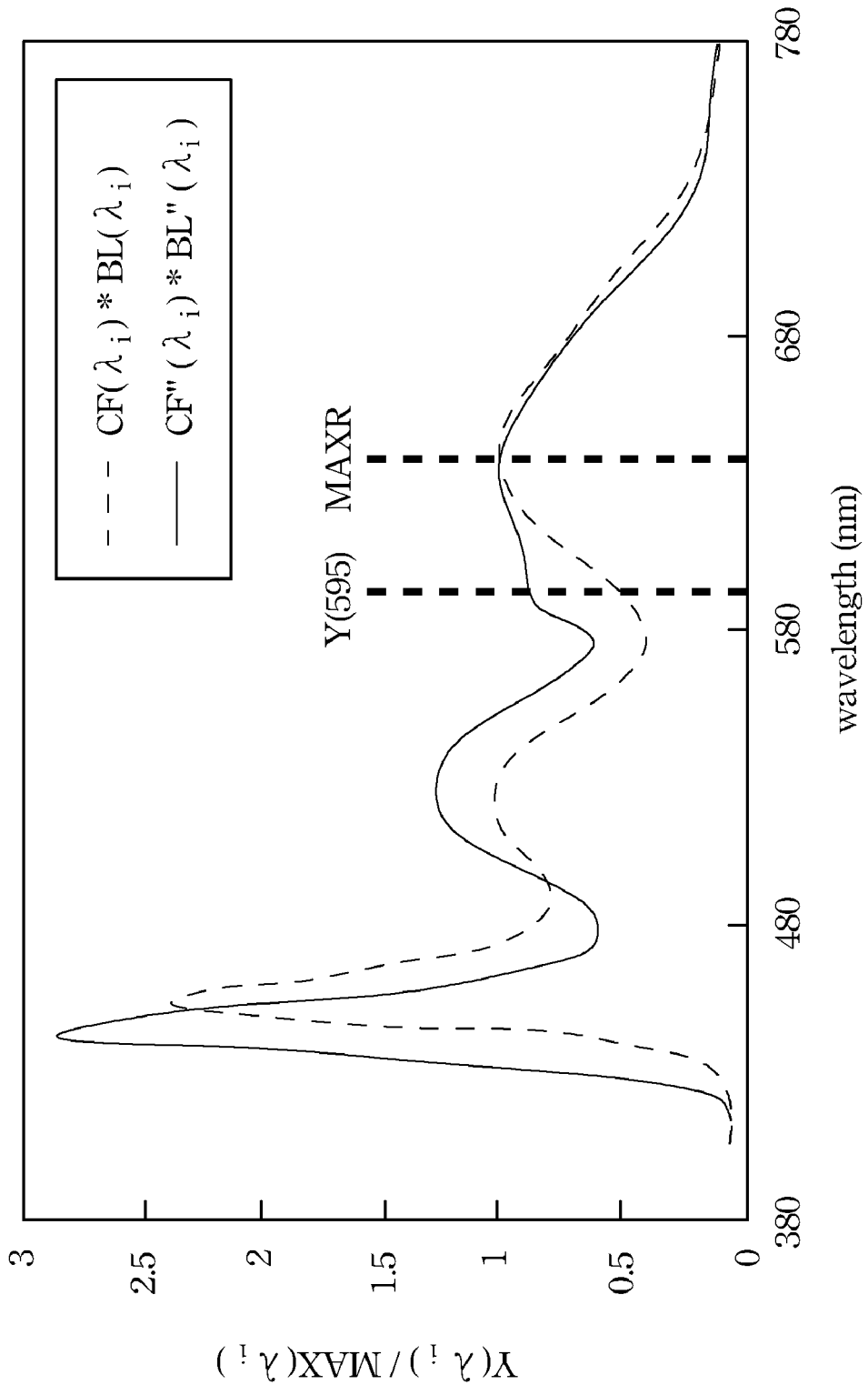
FIGS. 3a-3c illustrate the comparisons of Y($\lambda_1$) and MAX ($\lambda_2$) between the display with modified resists and backlight and the display without modified resists and backlight according to the embodiments of the present invention.

FIG. 3a illustrates the comparison of $Y(\lambda_1)$ and $MAX(\lambda_2)$ between the display with modified resists and backlight and the display without modified resists and backlight according to the embodiment of the present invention. As shown in FIG. 3a, the horizontal axis represents the wavelength of the light spectrum, the vertical axis represents the dimensionless ratio $Y(\lambda_i)/MAX(\lambda_i)$, the dotted line represents the condition before the resists and backlight are modified, the solid line represents the condition after the resists and backlight are modified, MAXR represents the maximum of the product of the transmission spectrum $CF(\lambda_2)$ and the emission spectrum $BL(\lambda_2)$ when the wavelength $\lambda_2$ ranges between 620 nm and 680 nm (within band of red light), and Y(595) represents the product of the transmission spectrum $CF(\lambda_1)$ and the emission spectrum $BL(\lambda_1)$ when the wavelength $\lambda_1$ is approximately 595 nm. Similarly, even if a new backlight module has a new emission spectrum $BL''(\lambda_i)$, the chrominance standard of sRGB can still be met if for the display 100 with modified resists the transmission spectrum $CF''(\lambda_i)$ of the color filter 104 and the new emission spectrum $BL''(\lambda_i)$ have the relation of $0.55 \leq Y(595)/MAXR \leq 1$ therebetween. Thus, the foregoing method can be employed for different kinds of WLEDs.

Figure 3B:
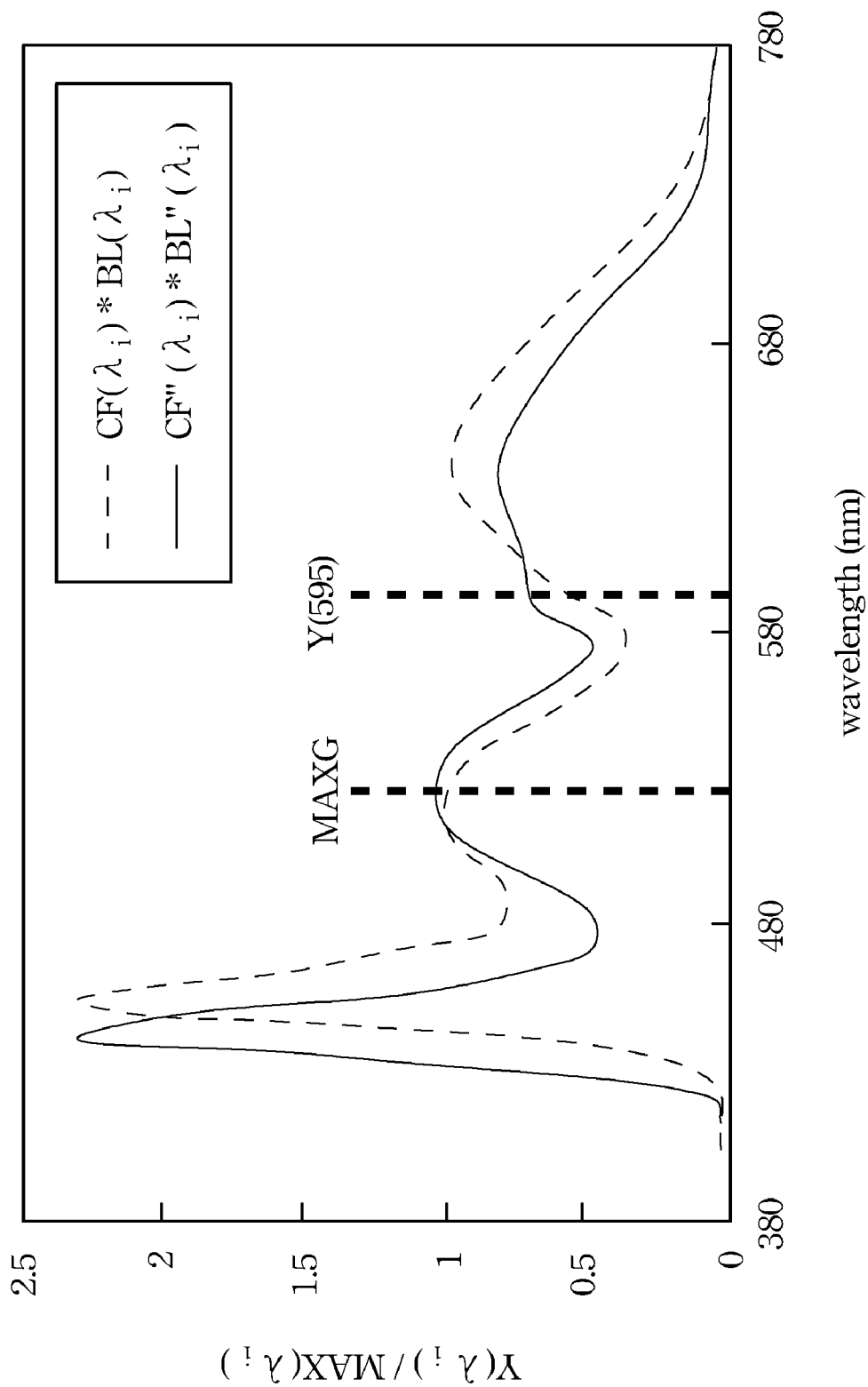

FIG. 3b illustrates the comparison of $Y(\lambda_1)$ and $MAX(\lambda_2)$ between the display with modified resists and backlight and the display without modified resists and backlight according to the embodiment of the present invention. As shown in FIG.

3b, the horizontal axis represents the wavelength of the light spectrum, the vertical axis represents the dimensionless ratio $Y(\lambda_i)/MAX(\lambda_j)$, the dotted line represents the condition before the resists and backlight are modified, the solid line represents the condition after the resists and backlight are modified, MAXG represents the maximum of the product of the transmission spectrum $CF(\lambda_2)$ and the emission spectrum $BL(\lambda_2)$ when the wavelength $\lambda_2$ ranges between 490 nm and 570 nm (within band of green light), and Y(595) represents the product of the transmission spectrum $CF(\lambda_1)$ and the emission spectrum $BL(\lambda_1)$ when the wavelength $\lambda_1$ is approximately 595 nm. Similarly, the chrominance standard of sRGB can still be met if for the display 100 with modified resists the transmission spectrum $CF''(\lambda_i)$ of the color filter 104 and the new emission spectrum $BL''(\lambda_i)$ have the relation of $0.55 \leq Y(595)/MAXG \leq 1$ therebetween. Thus, the foregoing method can be employed for different kinds of WLEDs.

Figure 3C:
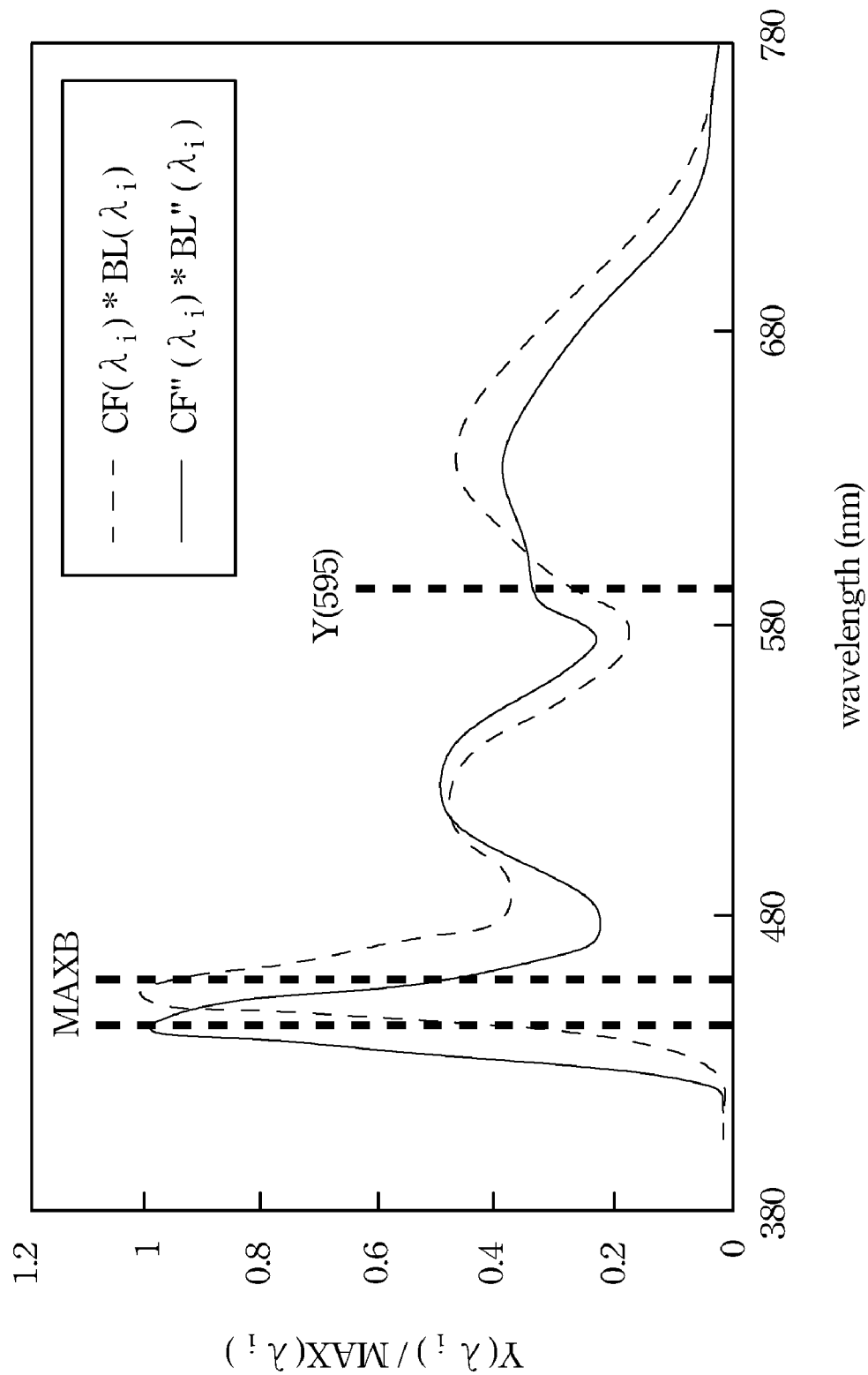

FIG. 3c illustrates the comparison of $Y(\lambda_1)$ and $MAX(\lambda_2)$ between the display with modified resists and backlight and the display without modified resists and backlight according to the embodiment of the present invention. As shown in FIG. 3c, the horizontal axis represents the wavelength of the light spectrum, the vertical axis represents the dimensionless ratio $Y(\lambda_i)/MAX(\lambda_j)$, the dotted line represents the condition before the resists and backlight are modified, the solid line represents the condition after the resists and backlight are modified, MAXB represents the maximum of the product of the transmission spectrum $CF(\lambda_2)$ and the emission spectrum $BL(\lambda_2)$ when the wavelength $\lambda_2$ ranges between 430 nm and 470 nm (within band of blue light), and Y(595) represents the product of the transmission spectrum $CF(\lambda_1)$ and the emission spectrum $BL(\lambda_1)$ when the wavelength $\lambda_1$ is approximately 595 nm. Similarly, the chrominance standard of sRGB can still be met if for the display 100 with modified resists the transmission spectrum $CF''(\lambda_i)$ of the color filter 104 and the new emission spectrum $BL''(\lambda_i)$ have the relation of $0.25 \leq Y(595)/MAXB \leq 1$ therebetween. Thus, the foregoing method can be employed for different kinds of WLEDs.

On the other hand, the relations of the transmission spectrum $CF(\lambda_i)$ and the emission spectrum $BL(\lambda_i)$ described above can also be employed in the larger size display (e.g. flat TV) such that the image shown on the display can meet the chrominance standard of EBU (European Broadcasting Union) when the emission spectrum $BL(\lambda_i)$ and the transmission spectrum $CF(\lambda_i)$ have one of the foregoing specific relations therebetween. EBU is the chrominance standard adopted by the conventional European TVs, and its chrominance coordinates (Rx, Ry) of the red color is (0.64, 0.33), its chrominance coordinates (Gx, Gy) of the green color is (0.29, 0.60), and its chrominance coordinates (Bx, By) of the blue color is (0.15, 0.06); sRGB is the chrominance standard adopted by the conventional IT products. The difference between EBU and sRGB is that the X-axis chrominance values Gx of the green color of both are different; however, the methods described in the foregoing embodiments of the present invention would not affect the chrominance value Gx of the green color. Therefore, the methods described in the foregoing embodiments of the present invention can be employed both in the display with the chrominance standard of sRGB and in the display with the chrominance standard of EBU.

Figure 4A:
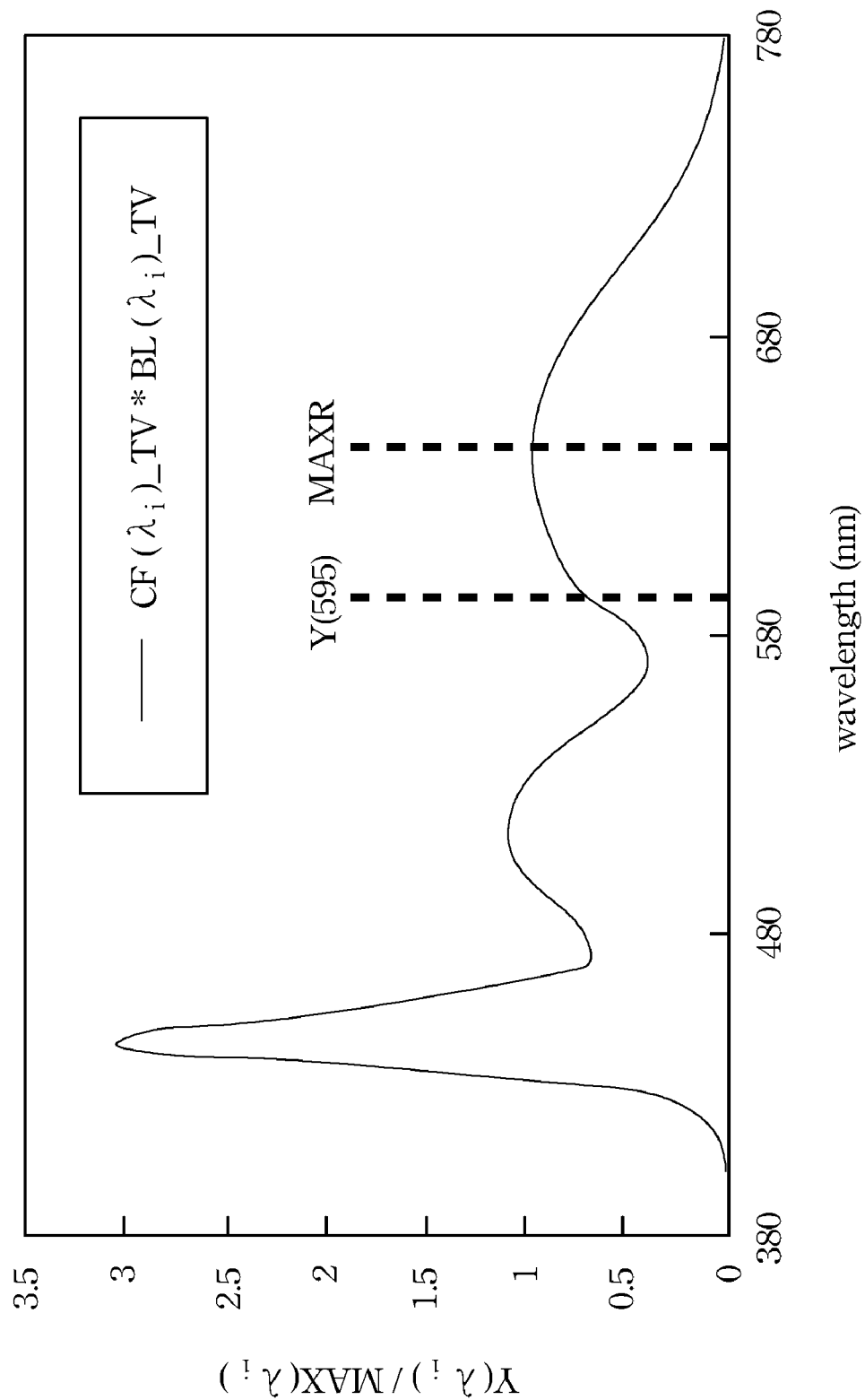
FIG. 4a-4c illustrate the comparisons of Y($\lambda_1$) and MAX ($\lambda_2$) in the large size display with modified resists according to the embodiments of the present invention.

FIG. 4a illustrates the comparison of $Y(\lambda_1)$ and $MAX(\lambda_2)$ in the large size display with modified resists according to the embodiment of the present invention. As shown in FIG. 4a, CF_TV represents the transmission spectrum of the color filter in the large size display, BL_TV represents the emission spectrum of the WLEDs on the backlight module in the large size display, MAXR represents the maximum of the product of the transmission spectrum $CF\_TV(\lambda_2)$ and the emission spectrum $BL\_TV(\lambda_2)$ when the wavelength $\lambda_2$ ranges between 620 nm and 680 nm (within band of red light), and Y(595) represents the product of the transmission spectrum $CF\_TV(\lambda_1)$ and the emission spectrum $BL\_TV(\lambda_1)$ when the wavelength $\lambda_1$ is approximately 595 nm. As shown in the figure, Y(595) and MAXR have the relation of $0.55 \leq Y(595)/MAXR \leq 1$ therebetween.

Figure 4B:
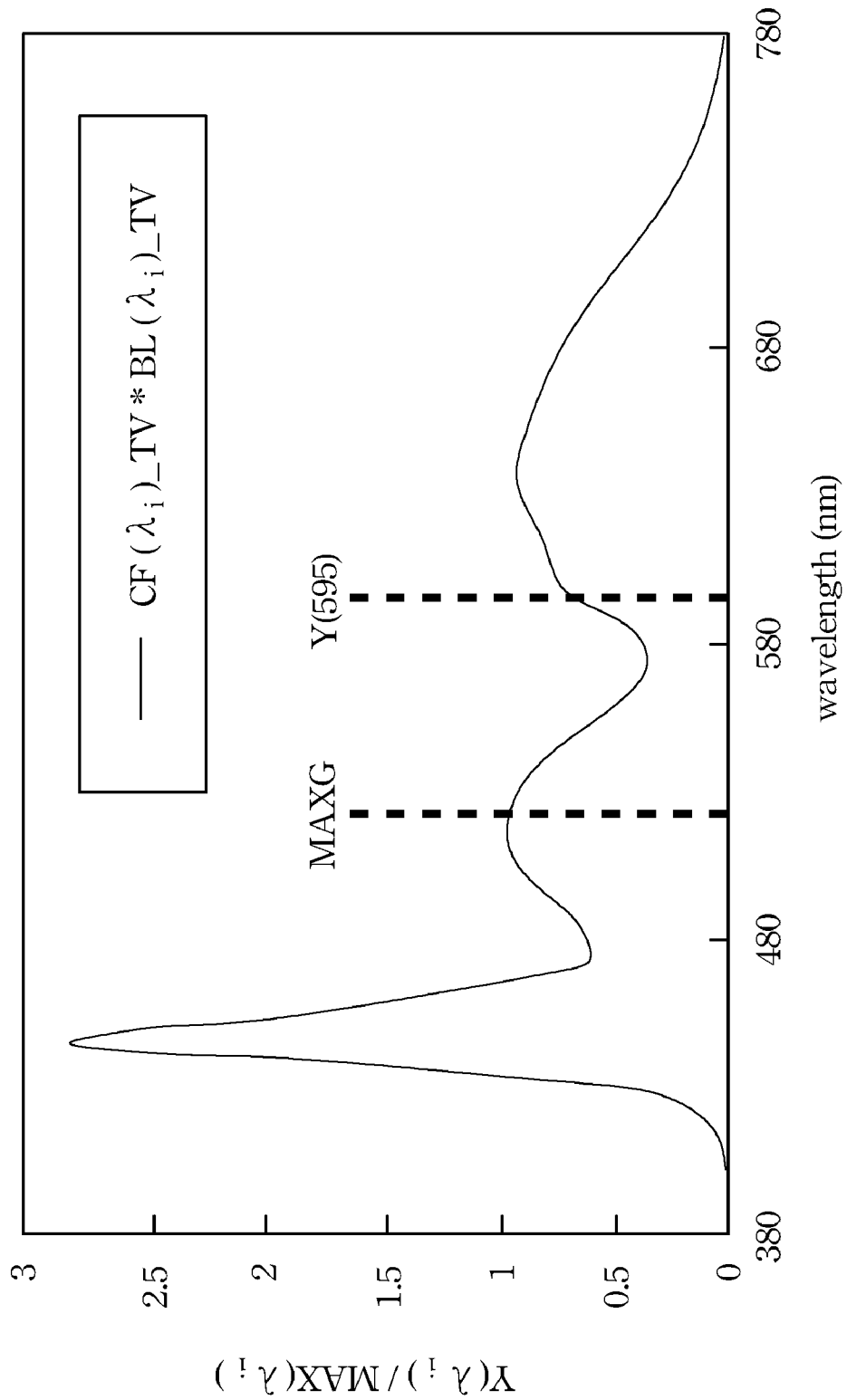

FIG. 4b illustrates the comparison of $Y(\lambda_1)$ and $MAX(\lambda_2)$ in the large size display with modified resists according to the embodiment of the present invention. As shown in FIG. 4b, CF_TV represents the transmission spectrum of the color filter in the large size display, BL_TV represents the emission spectrum of the WLEDs on the backlight module in the large size display, MAXG represents the maximum of the product of the transmission spectrum $CF\_TV(\lambda_2)$ and the emission spectrum $BL\_TV(\lambda_2)$ when the wavelength $\lambda_2$ ranges between 490 nm and 570 nm (within band of green light), and Y(595) represents the product of the transmission spectrum $CF\_TV(\lambda_1)$ and the emission spectrum $BL\_TV(\lambda_1)$ when the wavelength $\lambda_1$ is approximately 595 nm. As shown in the figure, Y(595) and MAXG have the relation of $0.55 \leq Y(595)/MAXG \leq 1$ therebetween.

Figure 4C:
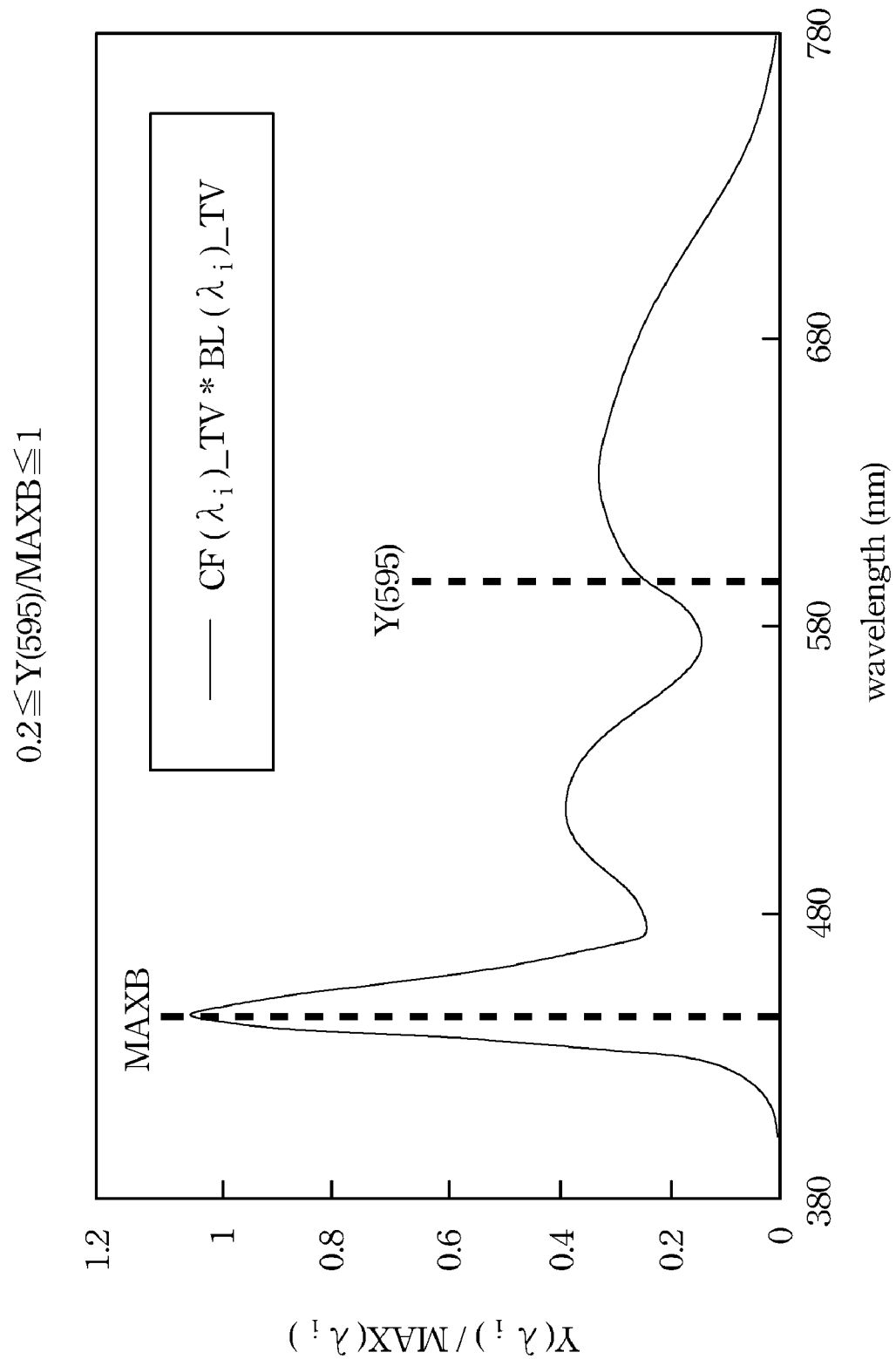

FIG. 4c illustrates the comparison of $Y(\lambda_1)$ and $MAX(\lambda_2)$ in the large size display with modified resists according to the embodiment of the present invention. As shown in FIG. 4c, CF_TV represents the transmission spectrum of the color filter in the large size display, BL_TV represents the emission spectrum of the WLEDs on the backlight module in the large size display, MAXB represents the maximum of the product of the transmission spectrum $CF\_TV(\lambda_2)$ and the emission spectrum $BL\_TV(\lambda_2)$ when the wavelength $\lambda_2$ ranges between 430 nm and 470 nm (within band of blue light), and Y(595) represents the product of the transmission spectrum $CF\_TV(\lambda_1)$ and the emission spectrum $BL\_TV(\lambda_1)$ when the wavelength $\lambda_1$ is approximately 595 nm. As shown in the figure, Y(595) and MAXB have the relation of $0.2 \leq Y(595)/MAXB \leq 1$ therebetween.

Figure 5:
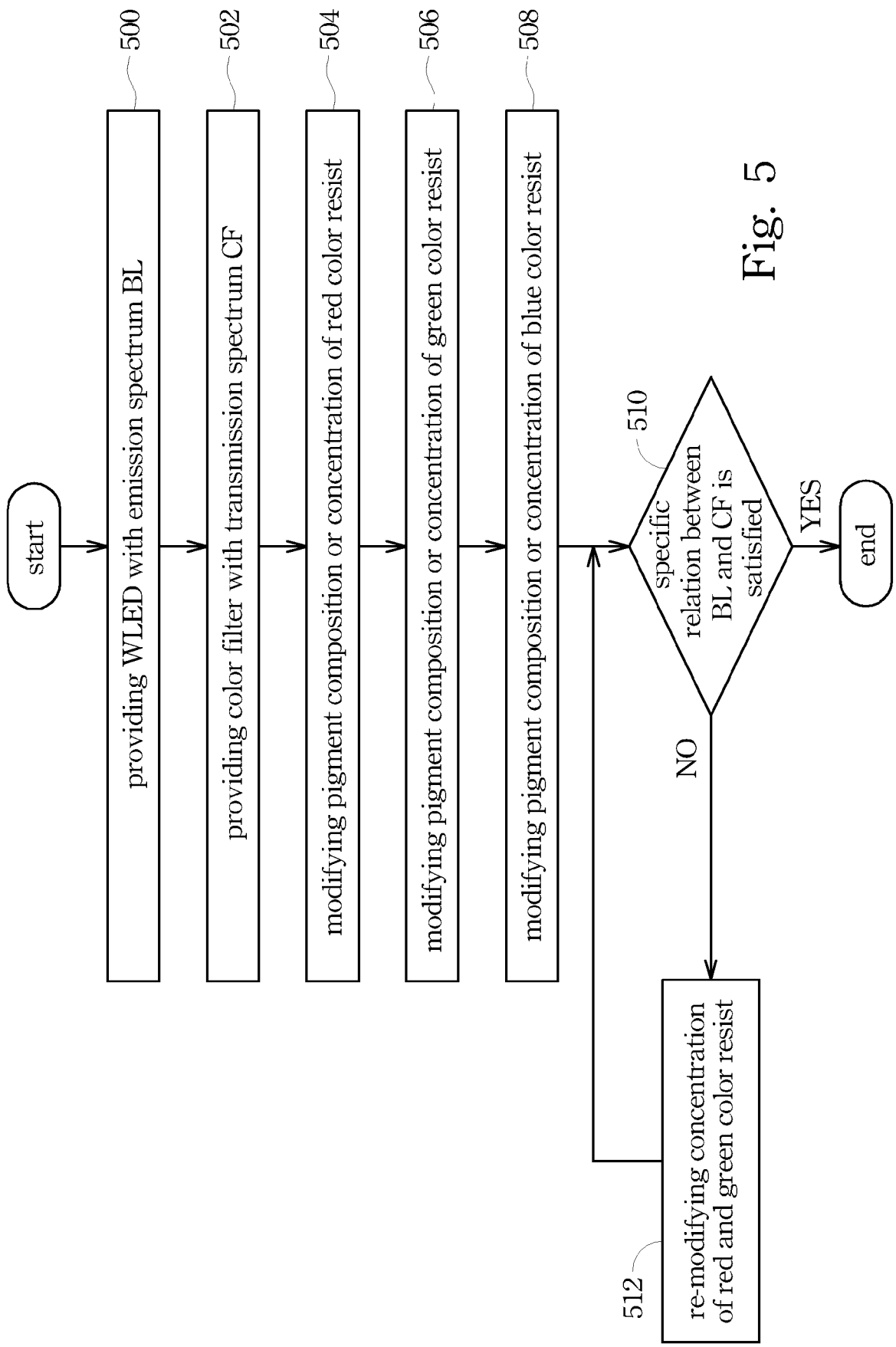
FIG. 5 illustrates a flow chart of the method for modifying the color resists of the color filter according to one embodiment of the present invention.

In addition, a method for modifying the color resists of the color filter is also provided according to one embodiment of the present invention, so as to improve the image shown on the display. FIG. 5 illustrates a flow chart of the method for modifying the color resists of the color filter according to one embodiment of the present invention. First, a white light-emitting diode (WLED) is provided, in which the WLED emits light having wavelength of $\lambda_i$ and has an emission spectrum $BL(\lambda_i)$ (Step 500). Then, a color filter having a transmission spectrum $CF(\lambda_i)$ is provided (Step 502), in which the color filter includes a plurality of red, green and blue color resists (or filtering layers).

After that, the compositions or concentrations of the pigments of the red color resists are modified to increase the transmission rate of the wavelength $\lambda_i$ ranging between 580 nm and 600 nm for the red color resists (Step 504), and the compositions or concentrations of the pigments of the green color resists are modified to increase the transmission rate of the wavelength $\lambda_i$ ranging between 570 nm and 590 nm for the green color resists (Step 506). Afterwards, the compositions or concentrations of the pigments of the blue color resists are modified to increase the color saturation of the blue color resists (Step 508). In one embodiment, the compositions or concentrations of the pigments of the red color resists are modified such that the transmission rate of the wavelength $\lambda_i$ being approximately 590 nm for the red color resists is increased, and the compositions or concentrations of the pigments of the green color resists are modified such that the transmission rate of the wavelength $\lambda_j$ being approximately 580 nm for the green color resists is increased.

Notably, Steps 500 and 502 can be alternately performed or even performed at the same time, and Steps 504, 506 and 508 for modifying the color resists also can be alternately performed or even performed at the same time, and not limited to what is shown in FIG. 5.

Then, if the emission spectrum $BL(\lambda_i)$ and the transmission spectrum $CF(\lambda_i)$ having specific relations therebetween according to the modified red color resists and green color resists, as follows, is determined (Step 510).

$$Y(\lambda_i)=CF(\lambda_i)\times BL(\lambda_i), \lambda_i=\lambda_1;$$

$$MAX(\lambda_i)=MAX[CF(\lambda_i)\times BL(\lambda_i)], \lambda_i=\lambda_2;$$

$$0.55 \leq Y(\lambda_1)/MAX(\lambda_2) \leq 1;$$

in which the wavelength $\lambda_1$ can be approximately 595 nm, the wavelength $\lambda_2$ ranges between 620 nm and 680 nm, $Y(\lambda_1)$ is a product of the transmission spectrum $CF(\lambda_1)$ and the emission spectrum $BL(\lambda_1)$, $MAX(\lambda_2)$ is a maximum of the product of the transmission spectrum $CF(\lambda_2)$ and the emission spectrum $BL(\lambda_2)$.

If the emission spectrum $BL(\lambda_i)$ and the transmission spectrum $CF(\lambda_i)$ have the specific relations described above, therebetween, modifying the compositions or concentrations of the pigments of the red and green color resists will not be necessary. On contrary, if the emission spectrum $BL(\lambda_i)$ and the transmission spectrum $CF(\lambda_i)$ fail to have the specific relations described above, therebetween, the compositions or concentrations of the pigments of the red and green color resists are re-modified (Step 512). After that, Step 510 is performed again to determine if the emission spectrum $BL(\lambda_j)$ and the transmission spectrum $CF(\lambda_i)$ have the specific relations therebetween.

For the foregoing embodiments, the display and the method for modifying the color resists of the color filter described above can be employed to improve the color performance of the displayed image such that the color performance can be more natural and the chrominance of the displayed image can meet the standard of sRGB or EBU when the display utilizes WLEDs as a backlight source.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A display, comprising:
    a white light-emitting diode (WLED), for emitting light having wavelength of $\lambda_i$ or $\lambda_j$, having an emission spectrum $BL(\lambda_i$ or $\lambda_j)$; and
    a color filter corresponding to the WLED and comprising a plurality of red, green and blue color resists, the color filter having a transmission spectrum $CF(\lambda_i$ or $\lambda_j)$;
    wherein the emission spectrum $BL(\lambda_i$ or $\lambda_j)$ and the transmission spectrum $CF(\lambda_i$ or $\lambda_j)$ have specific relations therebetween, as follows:

$$Y(\lambda_i)=CF(\lambda_i)\times BL(\lambda_i), \lambda_i=\lambda_1;$$

$$MAX(\lambda_j)=MAX[CF(\lambda_j)\times BL(\lambda_j)], \lambda_j=\lambda_2;$$

$$0.20 \leq Y(\lambda_1)/MAX((\lambda_2)) \leq 1;$$

wherein the wavelength $\lambda_1$ ranges between 590 nm and 600 nm, $Y(\lambda_1)$ is a product of the transmission spectrum $CF(\lambda_1)$ and the emission spectrum $BL(\lambda_1)$, $MAX(\lambda_2)$ is a maximum of the product of the transmission spectrum $CF(\lambda_2)$ and the emission spectrum $BL(\lambda_2)$.

2. The display as claimed in claim 1, wherein the wavelength $\lambda_1$ is approximately 595 nm.

3. The display as claimed in claim 2, wherein $Y(\lambda_1)$ and $MAX(\lambda_2)$ further have another specific relation therebetween, as follows:

$$0.55 \leq Y(\lambda_1)/MAX(\lambda_2) \leq 1,$$

and the wavelength $\lambda_2$ ranges between 620 nm and 680 nm.

4. The display as claimed in claim 2, wherein a white balance color temperature of the display ranges between 8500 K and 11500 K.

5. The display as claimed in claim 4, wherein the wavelength $\lambda_2$ ranges between 430 nm and 470 nm.

6. The display as claimed in claim 2, wherein a white balance color temperature of the display ranges between 5000 K and 8500 K.

7. The display as claimed in claim 6, wherein $Y(\lambda_1)$ and $MAX(\lambda_2)$ further have another specific relation therebetween, as follows:

$$0.25 \leq Y(\lambda_1)/MAX(\lambda_2) \leq 1,$$

and the wavelength $\lambda_2$ ranges between 430 nm and 470 nm.

8. The display as claimed in claim 1, wherein $Y(\lambda_1)$ and $MAX(\lambda_2)$ further have another specific relation therebetween, as follows:

$$0.65 \leq Y(\lambda_1)/MAX(\lambda_2) \leq 1,$$

and the wavelength $\lambda_2$ ranges between 620 nm and 680 nm.

9. The display as claimed in claim 1, wherein $Y(\lambda_1)$ and $MAX(\lambda_2)$ further have another specific relation therebetween, as follows:

$$0.70 \leq Y(\lambda_1)/MAX(\lambda_2) \leq 1,$$

and the wavelength $\lambda_2$ ranges between 490 nm and 570 nm.

10. The display as claimed in claim 1, wherein $Y(\lambda_1)$ and $MAX(\lambda_2)$ further have another specific relation therebetween, as follows:

$$0.25 \leq Y(\lambda_1)/MAX(\lambda_2) \leq 1,$$

and the wavelength $\lambda_2$ ranges between 430 nm and 470 nm.

11. The display as claimed in claim 1, wherein a red image shown on the display has an X-axis chrominance value ranging from 0.635 to 0.75 on a CIE 1931 chrominance chart.

12. The display as claimed in claim 1, wherein a green image shown on the display has a Y-axis chrominance value ranging from 0.595 to 0.85 on a CIE 1931 chrominance chart.

13. The display as claimed in claim 1, wherein a blue image shown on the display has a Y-axis chrominance value ranging from 0 to 0.065 on a CIE 1931 chrominance chart.

14. A method for modifying color resists of color filter, comprising:
    providing a white light-emitting diode (WLED) emitting light having wavelength of $\lambda_i$ and having an emission spectrum $BL(\lambda_i$ or $\lambda_j)$;
    providing a color filter comprising a plurality of red, green and blue color resists and having a transmission spectrum $CF(\lambda_i)$;
    modifying compositions or concentrations of pigments of the red color resists to increase transmission rate of the wavelength $\lambda_i$ ranging between 580 nm and 600 nm for the red color resists; and modifying compositions or concentrations of pigments of the green color resists to increase transmission rate of the wavelength $\lambda_i$ ranging between 570 nm and 590 nm for the green color resists.

15. The method as claimed in claim 14, further comprising:
determining if the emission spectrum $BL(\lambda_i$ or $\lambda_j)$ and the transmission spectrum $CF(\lambda_i$ or $\lambda_j)$ having specific relations therebetween according to the modified red color resists and green color resists, as follows:

$Y(\lambda_i)=CF(\lambda_i) \times BL(\lambda_i), \lambda_i=\lambda_1;$ $MAX(\lambda_j)=MAX[CF(\lambda_j) \times BL(\lambda_j)], \lambda_j=\lambda_2;$ $0.55 \leq Y(\lambda_1)/MAX(\lambda_2) \leq 1;$ wherein the wavelength $\lambda_1$ is approximately 595 nm, the wavelength $\lambda_2$ ranges between 620 nm and 680 nm, $Y(\lambda_1)$ is a product of the transmission spectrum $CF(\lambda_1)$ and the emission spectrum $BL(\lambda_1)$, $MAX(\lambda_2)$ is a maximum of the product of the transmission spectrum $CF(\lambda_2)$ and the emission spectrum $BL(\lambda_2)$.

16. The method as claimed in claim 15, further comprising:
re-modifying the compositions or concentrations of the pigments of the red and green color resists when the emission spectrum $BL(\lambda_i)$ and the transmission spectrum $CF(\lambda_i)$ failing to have the specific relations therebetween.

17. The method as claimed in claim 14, further comprising:
modifying compositions or concentrations of pigments of the blue color resists to increase color saturation of the blue color resists.

18. The method as claimed in claim 14, wherein the compositions or concentrations of the pigments of the red color resists are modified such that the transmission rate of the wavelength $\lambda_i$ being approximately 590 nm for the red color resists is increased, and the compositions or concentrations of the pigments of the green color resists are modified such that the transmission rate of the wavelength $\lambda_i$ being approximately 580 nm for the green color resists is increased.

19. A display, comprising:
a white light-emitting diode (WLED) as claimed in claim 14; and
a color filter corresponding to the WLED and comprising a plurality of red, green and blue color resists;
wherein the red color resists have the pigments with the modified compositions or concentrations, and the green color resists have the pigments with the modified compositions or concentrations determining if the emission spectrum $BL((\lambda_i$ or $\lambda_j)$ and the transmission spectrum $CF(\lambda_i$ or $\lambda_j)$ having specific relations therebetween according to the modified red color resists and green color resists, as follows:

$Y(\lambda_i)=CF(\lambda_i) \times BL(\lambda_i), \lambda_i=\lambda_1;$ $MAX(\lambda_j)=MAX[CF(\lambda_j) \times BL(\lambda_j)], \lambda_j=\lambda_2;$ $0.55 \leq Y(\lambda_1)/MAX(\lambda_2) \leq 1;$ wherein the wavelength $\lambda_1$ is approximately 595 nm, the wavelength $\lambda_2$ ranges between 620 nm and 680 nm, $Y(\lambda_1)$ is a product of the transmission spectrum $CF(\lambda_1)$ and the emission spectrum $BL(\lambda_1)$, $MAX(\lambda_2)$ is a maximum of the product of the transmission spectrum $CF(\lambda_2)$ and the emission spectrum $BL(\lambda_2)$.

20. The display as claimed in claim 19, wherein the blue color resists have the pigments with the modified compositions or concentrations to increase color saturation of the blue color resists.

* * * * *

UNITED STATES PATENT AND TRADEMARK OFFICE
CERTIFICATE OF CORRECTION

PATENT NO. : 8,102,602 B2
APPLICATION NO. : 12/390627
DATED : January 24, 2012
INVENTOR(S) : Hsu et al.

It is certified that error appears in the above-identified patent and that said Letters Patent is hereby corrected as shown below:

On the cover sheet, item (75), name of first inventor, please replace "Ya-Ling Su" with "Ya-Ling Hsu"

Signed and Sealed this
Thirteenth Day of March, 2012

David J. Kappos
*Director of the United States Patent and Trademark Office*